Patented Apr. 10, 1951

2,548,564

UNITED STATES PATENT OFFICE 2,548,564

PHOTOGRAPHIC SILVER HALIDE ELEMENT WITH MORDANTED DYE LAYER

Robert H. Sprague and Leslie G. S. Brooker, Rochester, N. Y., assignors to Eastman Kodak Company, Rochester, N. Y., a corporation of New Jersey No Drawing. Application December 31, 1946, Serial No. 719,623

6 Claims. (Cl. 95—8)

This invention relates to improvements in photographic layers and more particularly to improvements in mordant compositions used to fix soluble dyes therein.

Many photographic color processes involve the use of a soluble acid dye in a photographic layer. The dye may serve as a light filter or may be used as a light absorbing backing for the film to prevent reflection of light back into the emulsion. Soluble dyes of this type are commonly used in relief imbibition printing where the dye is transferred from a tanned gelatin relief to a gelatin coated paper. In each of these processes, it is essential that the dye be fixed against diffusion to prevent its bleeding out of the area to which it was originally confined. In order to accomplish this, fixing agents or mordants have been used. Mordants are believed to immobilize the dye molecule through the formation of a salt linkage with the dye, so that the dye molecule can no longer wander through the gelatin or other photographic layer employed.

We have found that the effectivenes of mordant compositions in preventing dye diffusion is dependent upon three factors. The first factor is degree of ionization. Since simple salt formation is believed to be the basis of mordant action, the mordant must be well ionized at the particular pH existing at the point of fixation. A high degree of ionization will lessen the quantity of mordant required to fix a given amount of dye. Secondly, the mordant must possess sufficiently large molecular dimensions so that the mordant-dye salt formed will not be able to diffuse through the colloid. The third factor is one of solubility. The mordant must be water dispersible and compatible with the gelatin or other colloid used.

According to our invention, all of the above requirements for an improved mordant composition may be fulfilled by using an addition type polymer containing periodically occurring quaternary ammonium groups. The polymeric structure provides a high molecular weight while the presence of quaternary ammonium groups results in a moderate equivalent weight and a high degree of ionization. The quaternary ammonium group has strong water-solubilizing properties, rendering the polymer water dispersible.

In particular, we have discovered that addition polymers prepared from vinyl substituted azines and containing quaternary ammonium groups are powerful mordants capable of fixing the soluble acid dyes used in photographic layers. By vinyl substituted azines we mean to include vinylpyridine and its homologues, such as vinyl- quinoline, vinylacridine and vinyl derivatives of other six-membered heterocyclic ring compounds containing nitrogen atoms. Certain vinyl heterocyclic five-membered rings containing nitrogen atoms may be employed, for example, 2-methylvinylbenzothiazole. The vinyl substituted azines may contain other substituents such as alkyl groups and may be quaternized before or after polymerization by reacting with a salt, such as an alkyl sulfate or methyl p-toluenesulfonate.

An addition polymer found to be useful in carrying out our invention is 2-vinylpyridine polymer metho-p-toluenesulfonate. The basic unit of this polymer is believed to be as follows:

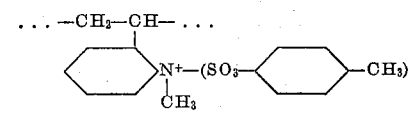

2-vinylpyridine polymer metho-p-toluenesulfonate may be prepared from polyvinylpyridine (French Patent 849,126) in the following manner:

*Example 1.—Preparation of 2-vinylpyridine polymer metho-p-toluenesulfonate*

A mixture of 5 grams of 2-vinylpyridine polymer and 10 grams of methyl p-toluenesulfonate was heated in an oil bath at 130° C. for 16 hours. A brown, viscous product was obtained, which was cooled, washed by decantation with two 100 cc. portions of ether, and the residue dissolved in 100 cc. of hot methyl alcohol. The solution was then filtered, evaporated to dryness and the product stirred with 15 cc. of cold acetone until semi-crystalline. The solid was collected on a filter, washed with acetone and dried in vacuo over $CaCl_2$. The yield was 7.4 grams or 53%.

The 2-vinylpyridine polymer etho-ethylsulfate may be prepared in the following manner:

*Example 2*

A mixture of 10 grams of 2-vinylpyridine polymer and 20 grams of diethyl sulfate was heated in an oil bath at 130° C. for 96 hours. The dark brown viscous product obtained was cooled, washed by decantation with two 100 cc. portions of ether and the sticky residue extracted with 600 cc. of hot methyl alcohol. The tarry residue was discarded. The solution was then chilled to 0° C., the alcohol decanted off and the rubbery product dissolved in 800 cc. of hot methyl alcohol. The solution was filtered, boiled 5 minutes with 5 grams of Norite and filtered through a steam-heated filter. The filtrate was concentrated to dryness and the residue was dried in vacuo over CaCl₂, the product being obtained in the form of a light gray plastic mass. A yield of 14.3 grams or 58% was obtained.

*Example 3.—Preparation of 4-vinylpyridine polymer metho-p-toluene-sulfonate*

A mixture of 10.5 grams of 4-vinylpyridine, 18.6 grams of methyl p-toluenesulfonate and 50 cc. of nitrobenzene was heated in an oil bath at 190° C. for 30 minutes. The brown solution was diluted with water and the nitrobenzene removed by steam distillation. The solution was decolorized by boiling with Norite for 10 minutes, filtered, and concentrated to 400 cc. under reduced pressure. The solid product was not isolated from the solution.

*Example 4*

2-vinylpyridine polymer metho-p-toluenesulfonate (Example 1) was prepared by a method similar to that of Example 3 from 10.5 grams of 2-vinylpyridine polymer, 18.6 grams of methyl p-toluenesulfonate and 50 cc. of nitrobenzene.

As an example of the photographic use of our improved mordant compositions in color processes, they may be employed to mordant dyes of the merocyanine type disclosed in Silberstein and Carroll U. S. application 646,206, filed February 7, 1946, now Patent No. 2,527,583, October 31, 1950, as in the following example:

*Example 5*

For the preparation of a multi-layer photographic element, the usual red-sensitive and green-sensitive silver halide emulsion layers were coated on a subbed film support. A solution was then prepared by dissolving one gram of 4-[(3-ethyl - 2(3) - benzoxazolylidine) ethylidine] - 3 - methyl-1-(p-sulfophenyl)-5-pyrazolone in the form of its sodium salt in 100 cc. of water. Three grams of polyvinylpyridine metho-p-toluenesulfonate were dissolved separately in 100 cc. of water and these two solutions were added successively with stirring to a solution of 18 grams of gelatin in 180 cc. of water. The resulting dispersion of a merocyanine dye was coated on the green-sensitive emulsion layer at such concentration that the dried coating contained 1 pound of gelatin per 700 sq. ft. of surface. The usual blue-sensitive silver halide emulsion layer was coated on the dried filter layer.

There was found to be no diffusion of the filter dye into the adjacent emulsion layers and consequently, there was no loss in speed or other properties of the emulsions. Bleaching of the dye was found to be complete in most color processes using coupler development although in processes where the first developer contained a low concentration of sulfite, it was found preferable first to treat the film with a 10% solution of sodium sulfite followed by washing before the first developer.

It is apparent that variations in the above-mentioned compounds may be made without departing from the spirit of our invention. Substituents may be added to the addition polymer containing basic nitrogen atoms without destroying its mordant effectiveness. The salt or ester used to quaternize the polymer is not critical and may be selected from a number of compounds. The five or six membered ring compounds used as the basic unit may contain more than one nitrogen atom or may contain other substituents such as sulfur.

What we claim to be novel and desire to secure by U. S. Letters Patent is:

1. A light-sensitive photographic element comprising a support having thereon at least one silver halide emulsion layer and a layer of gelatin having distributed therein a substantially water-insoluble salt of a water-soluble acid dye with a quaternary ammonium salt of a polymerized heterocyclic compound selected from the class consisting of polymerized vinyl substituted azines, polymerized vinyl substituted azoles, and their homologues.

2. A light-sensitive photographic element comprising a support having thereon at least one silver halide emulsion layer and a layer of gelatin having distributed therein a substantially water-insoluble salt of a water-soluble acid dye with a quaternary ammonium salt of a polymerized vinyl substituted azine.

3. A light-sensitive photographic element comprising a support having thereon at least one silverhalide emulsion layer and a layer of gelatin having distributed therein a substantially water-insoluble salt of a water-soluble merocyanine dye derived from 2-methyl-benzoxazoles and pyrazolones containing an acid group, and a quaternary ammonium salt of polyvinyl pyridine.

4. A light-sensitive photographic element comprising a support having thereon at least one silver halide emulsion layer and a layer of gelatin having distributed therein a substantially water-insoluble salt of a water-soluble merocyanine dye derived from 2-methyl-benzoxazoles and pyrazolones containing an acid group, and 2-vinyl pyridine polymer metho-p-toluene sulfonate.

5. A light-sensitive photographic element comprising a support having thereon at least two gelatin layers, at least one of said gelatin layers being a silver halide emulsion layer and at least one of said gelatin layers having distributed therein a substantially water-insoluble salt of a water-soluble acid dye with a quaternary ammonium salt of a polymerized heterocyclic compound selected from the class consisting of polymerized vinyl substituted azines, polymerized vinyl substituted azoles, and their homologues.

6. A light-sensitive photographic element comprising a support having thereon at least two gelatin layers, at least one of said gelatin layers being a silver halide emulsion layer and at least one of said gelatin layers having distributed therein a substantially water-insoluble salt of a water-soluble acid dye with a quaternary ammonium salt of polyvinyl pyridine.

ROBERT H. SPRAGUE.
LESLIE G. S. BROOKER.

REFERENCES CITED

The following references are of record in the file of this patent:

UNITED STATES PATENTS

| Number | Name | Date |
| --- | --- | --- |
| 1,160,288 | Ives | Nov. 16, 1915 |
| 2,075,190 | Gaspar | Mar. 30, 1937 |
| 2,317,184 | Dreyfuss | Apr. 20, 1943 |
| 2,396,275 | Kirby | Mar. 12, 1946 |